Patented June 21, 1932

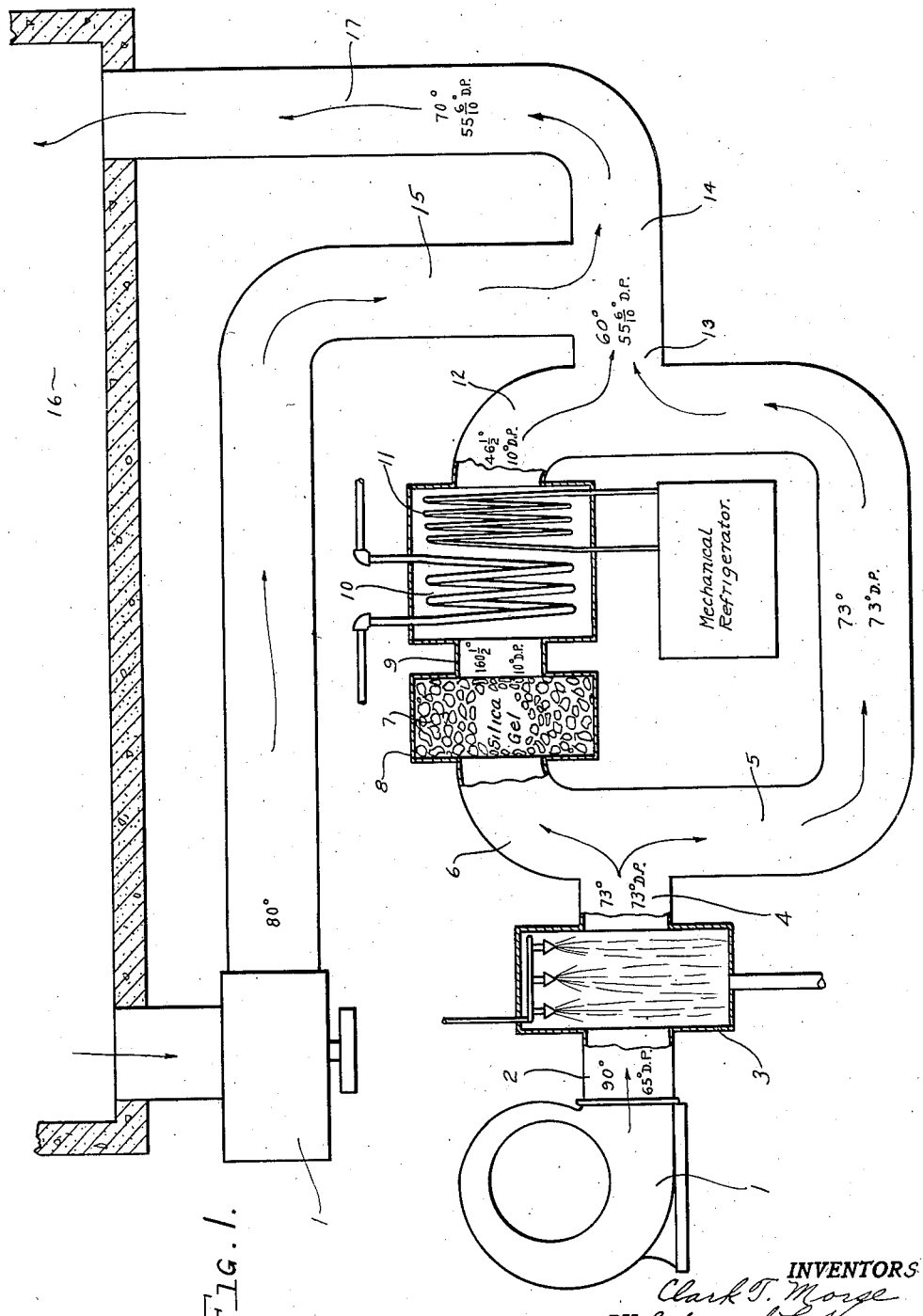

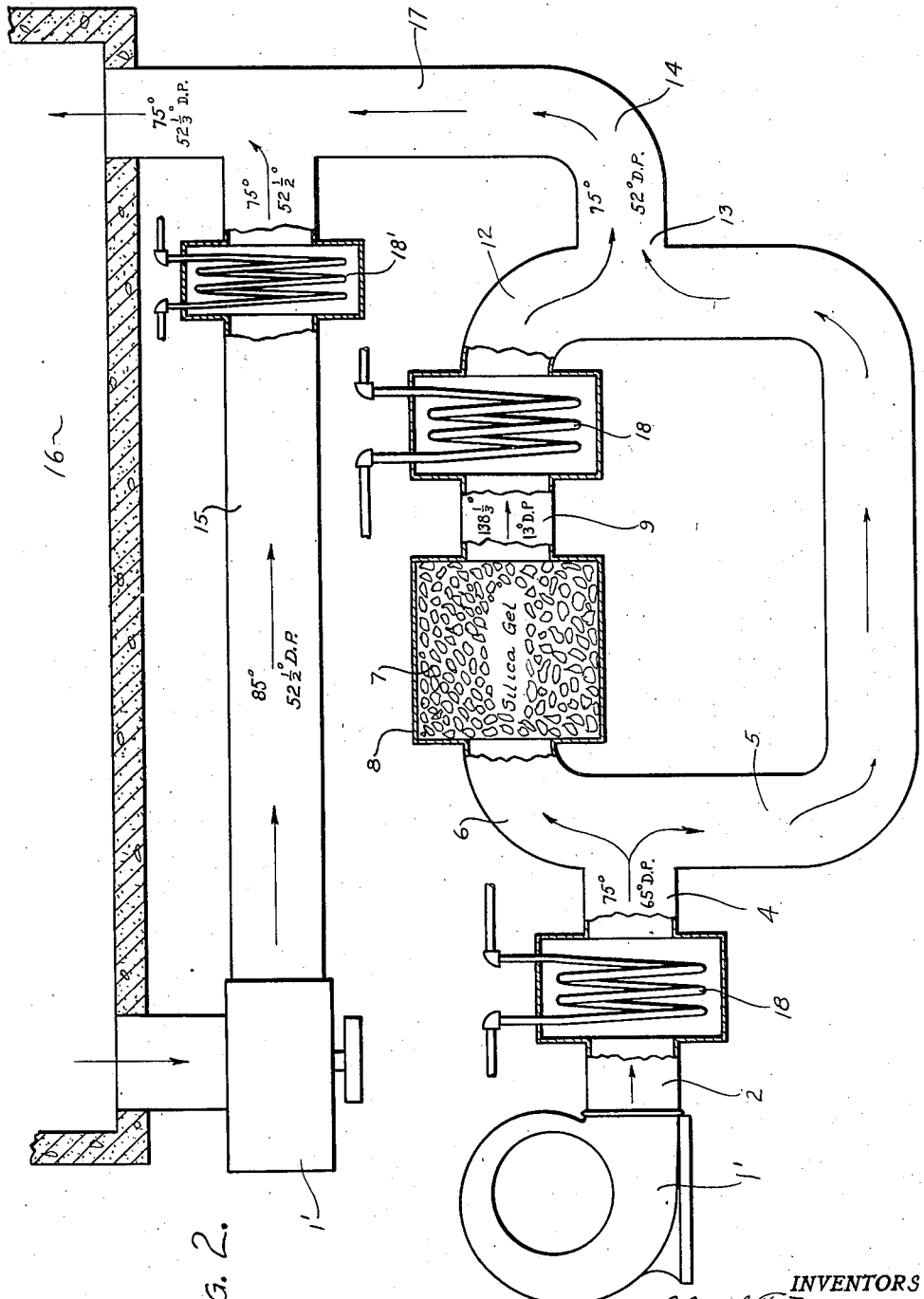

1,863,577

UNITED STATES PATENT OFFICE

CLARK T. MORSE AND EDWARD L. HOGAN, OF DETROIT, MICHIGAN, ASSIGNORS TO AMERICAN BLOWER CORPORATION, OF DETROIT, MICHIGAN, A CORPORATION OF DELAWARE

APPARATUS AND METHOD OF AIR CONDITIONING

Application filed November 22, 1929. Serial No. 408,954.

Our invention relates to a method and apparatus of air conditioning.

It is the object of our invention to provide for air conditioning of a body of air.

It is our particular object to condition air by bringing the main body of the air to a predetermined temperature and humidity, separating that body of air into two streams, treating one stream of the air to adjust its dew point to a relatively low point and its temperature to a higher point and to then mingle the two streams so that the resulting air will be of a predetermined desired dew point and temperature.

It is our object to accomplish this invention by treating the minimum amount of the incoming air to economize on the amount of dehumidification and cooling required, but, at the same time, to so vigorously treat it as to secure a powerful agent for adjusting the temperature and dew point of the remaining untreated air.

It is a further object to effect this treatment on a body of air, the temperature and dew point of which is brought to a predetermined standard at any given moment, before treatment is applied whereby accuracy of control is assured.

It is a further object to introduce the treated body of air into a recirculation stream in an enclosure, so that the reconsolidated stream with the adjusted dew point and temperature may be introduced into the recirculation stream for the enclosure.

Referring to the drawings,

Figure 1 is a diagrammatic view of a typical apparatus for the practice of our invention;

Figure 2 illustrates diagrammatically a system in which the air is standardized by precooling before diversion.

Referring to the drawings in detail, 1 is a fan for delivering air through the pipe 2 at, for instance, 90 degrees temperature and 65 degrees dew point. The air enters the air washer 3 so that the outgoing air through the pipe 4 will have a temperature reduced to 73 degrees and a dew point raised to 73 degrees. This body of air is divided into two streams, one of which passes through the pipe 5 and the other through the pipe 6. The reference numeral 1' is used to designate the fan used for the recirculation of the air.

The proportions passing through these pipes may be varied by valve mechanism or any other suitable means according to the results desired. As a typical instance, one-half of the air may pass through the pipe 6 and one-half through the pipe 5. That portion of the air passing through the pipe 5 will have a 73 degree temperature and a 73 degree dew point.

The portion passing through the pipe 6 which will start out with a similar temperature and dew point will first be passed through a body of silica gel 7 in the container 8 where the air will be dehumidified and the temperature raised so that the outgoing air in the pipe 9 will have a temperature of approximately 160½ degrees and a dew point of 10 degrees. We then pass the air over a cooling medium, such as a water coil 10, so that the air will not come in direct contact with the water. This cooling may be further accomplished by a mechanically refrigerated coil 11. The air will pass out of these cooling apparatuses through the pipe 12 at approximately a temperature of 46½ degrees but still at the same dew point of 10 degrees whence it is introduced at 13 into the common pipe 14 with the body of air passing through the pipe 5 of 73 degrees dew point and 73 degrees temperature. The result will be a modification of the air in the pipe 14 to a dew point of 55 6/10 degrees and of 60 degrees temperature. This air stream may be directly applied to an enclosure or introduced into recirculated air delivered by the pipe 15 from the enclosure 16 and thence back to the enclosure through the pipe 17. In pipe 15 is a cooler 18' similar to the cooler 18.

Thus, our method comprehends splitting the incoming air into two bodies, treating the smaller controlling body by dehumidifying it and raising its temperature, then cooling it without disturbing its dew point and then mingling this low dew point air with the lowered temperature into the main stream of higher temperature and higher dew point thereby securing a result of a relatively low dew point but of a comfortable sensible temperature.

Furthermore, before effecting this treatment, we will standardize the incoming air to a predetermined temperature and dew point by a direct application of the air to water so as to secure accuracy of control by always treating a standardized body of air irrespective of its condition from the outside of the system.

Furthermore, we will introduce the resulting low dew point moderately tempered air into the recirculation stream from an enclosure in which the introduced air will form a small, but controlling, medium for modifying the condition of the recirculation stream.

It will be understood that silica gel may be employed, but its use is mentioned only as typical of any dehumidification agency.

It will be understood as to the cooling that a water coil is used both because it is cheap for gross cooling and because the air does not come in direct contact with the water so that the dew point is not modified. Mechanical refrigeration is only used for securing the fine adjustment of temperature that is not possible with water running at ordinary temperatures through the coils.

In Figure 2, instead of using the air washer, we have substituted a cooler 18. For instance, if the enclosure, such as a theatre 16 requires 100,000 cubic feet of air for distribution, the outside temperature is 90 degrees and the dew point 65 degrees and the inside temperature desired is 85 degrees with a dew point of 52½ degrees and the people, lights, radiation, etc. make it necessary that the incoming air be 75 degrees and the dew point 52.34 degrees, then with a fresh air ventilation of 50,000 cubic feet and 50,000 cubic feet of recirculated air, we may proceed with this typical condition. 50,000 cubic feet of fresh air at 90 degrees with a dew point of 65 degrees will be passed through the cooler 18 reducing the temperature to 75 degrees and maintaining the dew point at 65 degrees. A portion of the air is taken through the silica gel which raises its temperature to 160½ degrees and its dew point to 13 degrees. It thence passes through the cooler where its temperature is reduced to 75 degrees and it is then joined with the remaining body of the air of 75 degrees temperature and 65 degrees dew point with the result that there is a 75 degree temperature and a 52.78 degree dew point of the rejoined air. This rejoined air is therefore introduced into the recirculation stream which is 75 degrees temperature and 52.34 degrees dew point with the result that the 100,000 cubic feet of air introduced into the theatre through the pipe 17 has a temperature of 75 degrees and a dew point of 52.34 degrees.

We do not desire to be confined to any specific temperature or dew point. We merely mention these typical degrees as illustrations of our process and apparatus.

The blower 1 delivers fresh air through the passageway 2, container 3 and passageway 4, where the air is divided into two streams. One stream passes through the passageway 5 without treatment. The other stream passes through the passageway 6 and is dehydrated by the silica gel 7, but its temperature is thereby raised. The temperature is then first lowered by water coils 10, which is an economical method of reducing the temperature of the air without increasing its moisture content. The final stage of cooling is effected by the refrigerant coils 11 without changing the moisture content of the air. The air is then delivered through the passageway 12, dehydrated and cooled where it mixes with the air from the passageway 5. At this point air is delivered from the inclosure 16 through the passageway 15 and mixed at 14 with the other streams of air. The three streams mix together, are delivered through the passageway 17 into the inclosure 16.

In Figure 2 the recirculated air may be cooled before introducing into the other two streams, as by the cooling coils 18.

It will be understood that we desire to comprehend within our invention such modifications as may be necessary to adapt it to varying conditions and uses.

Having thus fully described our invention, what we claim as new and desire to secure by Letters Patent, is:—

1. In a method of controlling air conditions, standardizing untreated air to a predetermined temperature and dew point, dividing the standardized air into two streams, treating one of said streams of air of predetermined temperature and dew point to reduce the dew point and elevate the temperature, reducing the temperature of said stream without disturbing the dew point and rejoining the two streams.

2. In a method of controlling air conditions, standardizing the air untreated to a predetermined temperature and dew point, dividing the standardized air into two streams, treating one of said streams of air of predetermined temperature and dew point to reduce the dew point and elevate the temperature, reducing the temperature of said stream without disturbing the dew point and rejoining the two streams, providing a recirculation stream from an enclosure and introducing the joined streams into the recirculation stream.

3. In a method of air conditioning, standardizing an incoming stream of untreated air to a predetermined temperature and dew point, dividing the stream, reducing the dew point and modifying the temperature of one portion of the stream of predetermined temperature and dew point and rejoining the streams to elevate the dew point above the place to which it has been lowered in one of the streams and below the place at which it has been raised in the other stream.

4. In an apparatus for air conditioning, means for delivering air in a stream, means for treating the stream of air adjacent said means first named, means for diverting a portion of the air from the stream and thence returning it to the stream, a dehumidifying means for the diverted air and a cooling means adapted to cool the diverted air, without disturbing its dehumidification, said cooling means comprising a water cooled coil and a refrigeration coil, each of said coils being connected to separate sources.

5. In an apparatus for air conditioning, means for delivering fresh outside air in a stream, means for diverting a portion of the air from the stream and thence returning it to the stream, a dehumidifying means for the diverted air and a plurality of cooling means adapted to cool the diverted air, without disturbing its dehumidification, one of said cooling means comprising a refrigeration coil each of said cooling means being connected to separate sources, an enclosure, means for withdrawing a portion of the air from the enclosure and redelivering it in a recirculation stream, and means of introducing the main body of air into the recirculation stream means.

6. In combination, an air washer, means to pass air therethrough, an exit line therefrom, and a shunt in said exit line for diverting a portion of the air in the exit line, said line having therein a silica gel container and a container having therein, a water cooling coil and a refrigerant coil, said coils having connections to separate sources whereby the temperature of one coil is unaffected by the temperature of the other coil.

7. In combination, an air washer, means to pass untreated air therethrough, an exit line therefrom, a shunt in said exit line for diverting a portion of the air in the exit line, a silica gel container in said line, a cooling coil in said line, and a refrigerating coil in said line, each of said coils being connected to separate sources.

8. In combination, an air washer, means to pass untreated air therethrough, an exit line therefrom, a shunt in said exit line for diverting a portion of the air in the exit line, a silica gel container in said line, a cooling coil in said line, and a refrigerating coil in said line, an enclosure, a recirculation line connected therewith and with said exit line beyond said shunt, each of said coils being connected to separate sources.

9. In combination, means of supply untreated air, means for cooling the air without disturbing the dew point, an exit means for said air, a shunt in said exit means, means for dehumidifying the air in the shunt so as to reduce the dew point and elevate the temperature, a cooling means for reducing the temperature of the air without disturbing the dew point, said cooling means consisting of a plurality of elements connected to separate sources for lowering the temperature of the air by stages.

In testimony whereof, we affix our signatures.

CLARK T. MORSE.
EDWARD L. HOGAN.